Aug. 27, 1940.　　　　　　　G. BUCKY　　　　　　2,212,854
FIELD DETERMINATOR AND EXPOSURE INDICATOR
Filed Jan. 26, 1939　　　　2 Sheets-Sheet 2
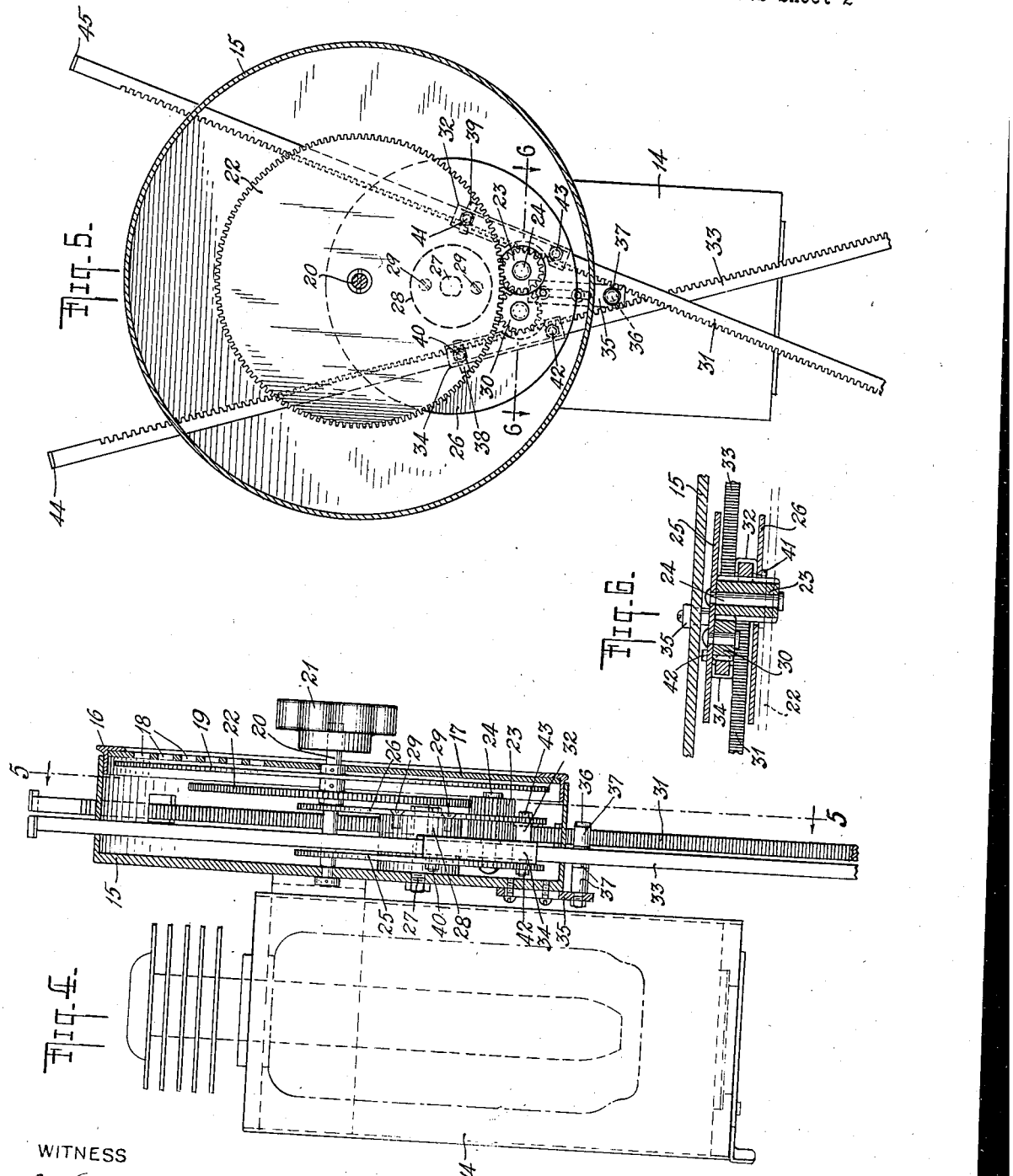
WITNESS
INVENTOR
GUSTAV BUCKY
BY
ATTORNEYS Patented Aug. 27, 1940

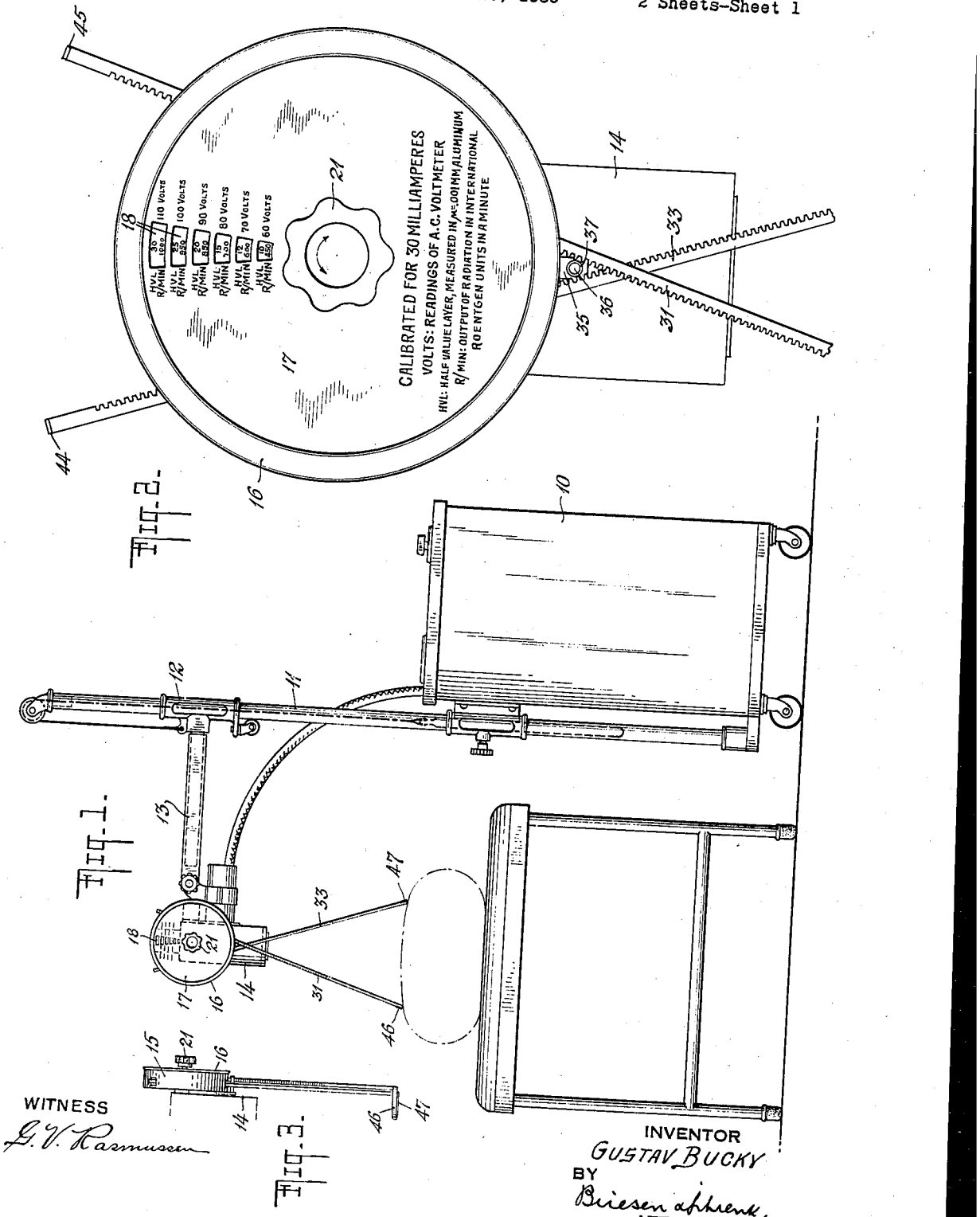

2,212,854

UNITED STATES PATENT OFFICE 2,212,854

FIELD DETERMINATOR AND EXPOSURE INDICATOR

Gustav Bucky, New York, N. Y., assignor, by mesne assignments, to Consolidated Research Corporation, New York, N. Y., a corporation of New York Application January 26, 1939, Serial No. 252,925

15 Claims. (Cl. 250—64)

My invention relates to an apparatus adapted for use in correlating an area or field size to be acted upon, as by an intensity of radiation or a photographic medium for reproduction or enlargement, to a definite distance necessary to utilize or affect the full area of the field, and more particularly, in one application of the apparatus, it relates to giving treatments to patients suffering from lesions of the skin or diseases requiring treatment by irradiation, for instance, by X-rays, Grenz rays, and similar therapeutic factors. In the treatment of such diseases and lesions, the physician is faced with the problem of effecting the irradiation of the full area of the lesion or the diseased surface without affecting the other parts of the body, for instance, the areas immediately adjacent the lesion or diseased surface. It is important to limit the field size of the radiation so that no more and no less than the actual area of the lesion or diseased skin surface is exposed to the beam of rays. It is usual practice, in the carrying out of therapeutic treatment by irradiation, for instance, with X-rays, to cover the other unaffected parts of the body with lead plates or similar material preventing the transmission of the rays therethrough.

The apparatus, constructed in accordance with my invention, further embodies means for automatically indicating the particular dosage of irradiation, or radiation intensity being applied, or the time of exposure, for instance, in making photographic reproductions or enlargements. Such automatic indication of the quantity of the radiation intensity, in one instance, or the quantum of exposure times, is accomplished simultaneously with the determination of the field size and the subsequent utilization or affecting of the thus determined full area of the field.

Thus, in accordance with my invention, I provide an apparatus which makes possible the substantially automatic determination of the specific field size in which the radiation is to be effective, and whereby, concurrently with the determination of such field size, the particular dosage of irradiation being applied to such specific field size is automatically indicated upon a disc in full vision of the physician.

In its simplest embodiment, my novel field determiner or effective beam coordinator, and dosage indicator comprises a unitary structure of extremely simple construction capable of application with facility to the conventional type of X-ray apparatus and consists of a housing, applied to the exterior casing of the X-ray tube, having a pair of diagonally disposed and crossed racks adapted for sliding movement by a pair of pinions meshing with the teeth of the racks so as to move such racks by means of a knob, controlling the rotation of the pinions, until the ends of the racks straddle and therefore determine the field size of radiation. Controlled by the rotation of the knob effecting the sliding movement of the two crossed racks, is a disc carrying upon its face notations of the particular dosages of X-ray output, the particular dosage for the particular field size fixed by the racks, being visible through an aperture in a covering disc. Thus, when the field size of irradiation to the full area of the lesion, or part of the body to be irradiated, has been fixed by means of the racks, the ends of which straddle the particular field, the amount of the X-ray dose being imparted to such field is clearly indicated to the physician by one of a series of notations appearing in a series of windows, each of which is designated by the particular voltage at which the X-ray apparatus is operated, so that all the physician has to do, once the field size of radiation has been determined by the ends of the racks, is to read the dosage appearing in the window opposite that marked with the voltage at which the X-ray apparatus is being operated.

A specific embodiment of my invention, showing its application to a radiation intensity producing device, is illustrated in the accompanying drawings as applied to the conventional ambulant type of X-ray apparatus. In such drawings, Fig. 1 is an elevation of an ambulant type of X-ray apparatus having my novel construction of field determinator and dosage indicator applied thereto and showing its mode of use to determine the field size of radiation of a portion of the body of a patient reclining upon a table in front of the X-ray apparatus; Fig. 2 is a front view of my novel field determinator and dosage indicator; Fig. 3 is a side view of the structure as applied to the X-ray apparatus illustrated in Fig. 1; Fig. 4 is a vertical section through my novel structure; Fig. 5 is a section on the line 5—5 of Fig. 4; and Fig. 6 is a section on the line 6—6 of Fig. 5.

Referring more particularly to the drawings, in which similar reference characters identify similar parts in the several views, 10 indicates generally the casing of an ambulant type of X-ray apparatus from which extends the vertical standard 11 along which slides a sleeve 12 carrying the arm 13 from the end of which is supported the conventional type of X-ray tube and housing 14. As the X-ray apparatus per se constitutes no part of my invention, the same is not herein described in detail.

My novel field determinator and dosage indicator comprises a casing 15 secured to the X-ray tube and housing 14 into the front face of which is pressed a ring 16 within which is mounted a plate 17 having a plurality of radially arcuate windows 18 vertically disposed along the upper half of the vertical center line of the plate. Positioned rearwardly of the plate 17, is a disc 19 carrying a plurality of circumferentially disposed notations giving the output of radiation in international Roentgen units per minute. The disc 19 is supported, and secured for rotation upon, a shaft 20 extending in suitable bearings through the plate 17 and into the back of the casing 15. At the outer end of the shaft 20 is secured a knob 21 having a preferably sinuous outline to facilitate gripping and rotation thereof.

Upon the shaft 20 and rearwardly of the disc 19, is secured a large gear 22 meshing with a pinion 23 secured upon shaft 24. The shaft 24 extends from a plate 25 supported with another plate 26, by bolt 27, upon the back face of the casing 15. A spacer 28 separates the plates 25 and 26, the latter being secured to the spacer by a pair of screws 29.

Meshing with the rear portion of the pinion 23 is another pinion 30 of less depth than the pinion 23, so that the rotation of the gear 22 effects the rotation of the pinion 23 in the opposite direction, which pinion in turn effects the rotation of the pinion 30 in a direction opposite to that of the rotation of the pinion 23.

Meshing with the forward portion of the teeth of the pinion 23, i. e. that portion which is immediately in advance of the portion of such teeth meshing with the pinion 30, are the teeth of the rack 31, extending at an angle to the vertical center line of the structure, through a supporting channel bracket 32. Meshing with the teeth of the pinion 30 is the second rack 33 supported for longitudinal sliding movement at an angle to the vertical center line of the structure in channel bracket 34.

Secured to the lower extremity of the back of the casing 15 is an elongated adjustable bar 35 from which extends forwardly a shaft 36 carrying at its end a pair of rollers 37, acting as a guide immediately above the point at which the two racks 31 and 33 cross, as indicated in Fig. 5. The crossing of the racks is at a point exactly opposite the source of radiation, and in the case of a camera, at the lens thereof.

For adjustment of the path of sliding movement of the two racks, in accordance with the requirements of the particular X-ray tube with which my novel construction of field determiner and dosage indicator is utilized, the two circular plates 25 and 26 are each provided with arcuate slots 38 and 39, respectively, through which slots extend adjusting bolts 40 and 41 determining the angularity, from the vertical, of the two rack brackets 32 and 34, the brackets being pivoted upon bolts 42 and 43. It will be noted that each of the rack brackets 32 and 34 has an arcuate recess accommodating the pinions 23 and 30.

The two racks 31 and 33, at their upper extremities, are provided with abutments 44 and 45 which, when the racks have been brought to their lowermost position, abut the ends of the brackets 32 and 34. The opposite, or lower, extremities of the racks are preferably provided, as shown in Fig. 3, with laterally extending projections 46 and 47 which are adapted, when adjusting the racks, by rotation of the knob 21, as hereinafter described, to be brought into contact with the body to abut, and substantially circumscribe, the field size of radiation.

The operation of my novel field determinator and dosage indicator is as follows:

After the patient has prepared for the treatment, for instance, by reclining upon the support shown in Fig. 1, and the ambulant X-ray apparatus has been brought into position so as to have the X-ray tube and housing immediately above the area to which the radiation is to be applied, the physician turns the knob 21 in a direction necessary to advance the two racks 31 and 33, rotation of the knob in the opposite direction being effective to retard the racks so as to clear the body or the area to be radiated, the rotation of the knob being continued until the two racks move downwardly a sufficient extent to have the extensions 46 and 47 at the lower extremities thereof contact the body so as to straddle the full area or field size of the lesion or portion of the body to which the radiation is to be applied. The racks in their downward movement are progressed by the rotation in opposite directions of the pinions 23 and 30 by the gear 22, the racks crossing at a point below the guiding roller 37. When the field size to which the radiation is to be applied has thus been automatically determined, the physician notes the particular voltage at which the X-ray apparatus is being operated, and is enabled to read directly the amount of the dosage from one of the windows 18, i. e. that opposite the particular voltage indication. As the disc 19 is calibrated for a particular quantity of milliamperes, 30 in the particular embodiment illustrated, the physician is able to read the output of radiation directly in international Roentgen units per minute.

Once an adjustment of the angular disposition of the racks by means of the arcuate slots 38 and 39 has been made for a particular size and type of X-ray tube, the apparatus is ready for instant repeated use without any further adjustment being necessary. However, as each X-ray tube is different in character, when a tube is replaced, it is necessary to make a re-adjustment for the new tube. This is accomplished, as hereinabove pointed out, by means of the adjusting bolts 40 and 41 extending through the arcuate slots 38 and 39.

While the particular embodiment of my novel structure illustrated and described has a limit of a field size of radiation which can automatically be determined thereby, of approximately 30 centimeters or 12 inches, it is obvious that my novel construction may be applied in the fabrication of apparatus having a larger or smaller limit of field size.

As hereinabove indicated, the particular embodiment of my invention as illustrated and described, demonstrates its applicability to conventional apparatus for therapeutic treatment. Other applications thereof, in connection with the correlating of the field size to a definite distance necessary to utilize or affect the full size of a field, in the determination and measurement of radiation intensity, will be obvious to those skilled in the art. The apparatus may also be utilized in connection with a camera, as in reproduction by photoprinting or in the making of enlargements by photographic methods. The field size to be photographed or enlarged may be determined and correlated as hereinabove described, a special, correspondingly calibrated disc, showing, for instance, the appropriate exposure times, being provided in place of the calibrated disc showing the radiation intensities.

While I have described a specific embodiment of my invention, it is obvious that various changes therein, particularly in the configuration, size, and disposition of the various elements, may be made therein, without departing from my invention.

I claim:

1. In combination, with a source of a beam of rays, of means indicating the exact correspondence and equivalency of the effective area of the beam too be irradiated, comprising a casing, a pair of longitudinally slidable members, disposed, to each other, at the same angle as to the effective angle of the cone of the beam, mounted for movement within, and extending from, said casing, and means for moving said members to have their extremities straddle the area to be irradiated.

2. In combination, with a source of a beam of rays, of movable means indicating the exact correspondence and equivalency of the effective area of the beam to the area to be irradiated, and means calibrated in accordance with the emission characteristics of the source of rays for indicating the amount and degree of the radiation imparted to the area, said movable means comprising a pair of elements disposed to each other at the same angle as the angle of the beam of rays, the relationship between said movable means and said calibrated means being such that the movement of the former effects a corresponding degree of movement of the latter.

3. In combination, with a source of a beam of rays, of movable means indicating the exact correspondence and equivalency of the effective area of the beam to the area to be irradiated, comprising a casing, a pair of longitudinally slidable members, disposed to each other, at the same angle as to the effective angle of the cone of the beam, mounted for movement within, and extending from, said casing, means for moving said members to have their extremities straddle the area to be irradiated, and means calibrated in accordance with the emission characteristics of the source of rays for indicating the amount and degree of the radiation imparted to the area, the relationship between said movable means and said calibrated means being such that the movement of the former effects a corresponding degree of movement of the latter.

4. In combination, with a source of a beam of rays, of movable means indicating the exact correspondence and equivalency of the effective area of the beam to the area to be irradiated, said movable means comprising a pair of elements disposed to each other at the same angle as the angle of the beam of rays, and means calibrated in accordance with the emission characteristics of the source of rays, operatively interconnected with said first means, for indicating the amount and degree of the radiation imparted to the area, comprising a calibrated disc mounted for rotation within said casing and a facing plate positioned in advance of the disc and having a plurality of apertures for viewing a series of calibrations upon the disc, the relationship between said movable means and said calibrated means being such that the movement of the former effects a corresponding degree of movement of the latter.

5. In combination, with a source of a beam of rays, of movable means indicating the exact correspondence and equivalency of the effective area of the beam to the area to be irradiated, comprising a casing, a pair of longitudinally slidable members, disposed at the same angle to each other as the angle of the beam of rays and in different planes, mounted for movement within, and extending from, said casing, means for moving said members to have their extremities straddle the area to be irradiated, and means calibrated in accordance with the emission characteristics of the source of rays, operatively interconnected with said first means, for indicating the amount and degree of the radiation imparted to the area, comprising a calibrated disc mounted for rotation within said casing and a facing plate positioned in advance of the disc and having a plurality of apertures for viewing a series of calibrations upon the disc, the relationship between said movable means and said calibrated means being such that the movement of the former effects a corresponding degree of movement of the latter.

6. In combination, with a source of a beam of rays, of means for indicating the field size to be irradiated, comprising a casing, a pair of toothed racks, disposed at the same angle to each other as the angle of the beam of rays, mounted for movement within, and extending from, said casing, and means cooperating with the teeth of said racks for moving said racks to have their extremities straddle the area to be irradiated.

7. In combination, with a source of a beam of rays, said source including a tube and a casing, of means for indicating the field size to be irradiated, comprising a casing, a pair of toothed racks, disposed at the same angle to each other as the angle of the beam of rays and in different planes, and crossing each other below said casing, and means for moving said members to have their extremities straddle the area to be irradiated, comprising a pair of pinions mounted for rotation in opposite directions and meshing with the racks.

8. In combination, with a source of a beam of rays, said source including a tube and a tube housing, of movable means indicating the exact correspondence and equivalency of the effective area of the beam to the area to be irradiated, comprising a casing secured to said tube housing, a pair of longitudinally slidable members, disposed at the same angle to each other as the angle of the beam of rays and in different planes, mounted for movement within, and extending from, said casing, a disc calibrated in accordance with the emission characteristics of the source of rays for indicating the amount and degree of the radiation imparted to the area so determined, and means for simultaneously moving said members to have their extremities straddle the area to be irradiated and for rotating said disc, the relationship between said movable means and said calibrated means being such that the movement of the former effects a corresponding degree of movement of the latter.

9. An apparatus indicating the exact correspondence and equivalency of an area to a definite distance necessary to utilize or affect the full size of the area, comprising a source of a beam of rays, a casing, a pair of longitudinally slidable members, disposed at the same angle to each other as the angle of the beam of rays, mounted for movement within, and extending from, said casing, and means for moving said members to have their extremities straddle the area.

10. An apparatus indicating the exact correspondence and equivalency of an area to a definite distance necessary to utilize or affect the full size of the area, comprising a source of a beam of rays, a casing, a shaft extending through the casing, a pair of pinions within said casing, means for rotating said pinions in opposite directions, and a pair of toothed racks movable by said pinions at the same angle to each other as the angle of the beam of rays, the racks being crossed at a point below said pinions and adapted to have their extremities straddle the area.

11. An apparatus indicating the exact correspondence and equivalency of an area to a definite distance necessary to utilize or affect the full size of the area, comprising a source of a beam of rays, a casing, a shaft extending through the casing, a gear mounted for rotation upon said shaft, a knob upon the end of the shaft outside of the casing, a pair of pinions rotatable in opposite directions, and a pair of toothed racks disposed in different planes and movable by said pinions at the same angle to each other as the angle of the beam of rays, the racks being crossed at a point below said pinions and adapted to have their extremities straddle the area.

12. A field determinator and radiation intensity indicator, comprising a casing, a source of radiation, a disc calibrated in accordance with the emission characteristics of the source of radiation mounted for rotation within said casing, a facing plate positioned in advance of the disc and having a plurality of apertures for viewing a series of calibrations upon the disc, a shaft extending through the casing, a pair of pinions within said casing, means for rotating said pinions in opposite directions, and a pair of toothed racks disposed in different planes and movable by said pinions at the same angle to each other as the angle of the beam of rays, the racks being crossed at a point below said pinions and adapted to have their extremities straddle the area to be irradiated, the relationship between said racks and said calibrated means being such that the movement of the former effects a corresponding degree of movement of the latter.

13. A field determinator and radiation intensity indicator for therapeutic treatment, for instance, by X-rays, comprising a casing, a source of radiation, a disc calibrated in accordance with the emission characteristics of the source of radiation mounted for rotation within said casing, a facing plate positioned in advance of the disc and having a plurality of apertures for viewing a series of calibrations upon the disc, a shaft extending through the casing, a gear mounted for rotation upon said shaft, a knob upon the end of the shaft outside of the casing, a pair of pinions rotatable in opposite directions, and a pair of toothed racks disposed in different planes and movable by said pinions at the same angle to each other as the angle of the beam of rays, the racks being crossed at a point below said pinions and adapted to have their extremities straddle the area to be irradiated, the relationship between said racks and said calibrated means being such that the movement of the former effects a corresponding degree of movement of the latter.

14. An apparatus as claimed in claim 9, including means for adjusting the relative position of the two slidable members with respect to each other.

15. An apparatus as claimed in claim 9, including means for adjusting the relative position of the two slidable members with respect to each other, said means including a pair of supporting brackets and a pair of plates each having an arcuate slot therein and an adjusting nut passing through said slot, and secured to the supporting bracket.

GUSTAV BUCKY.